March 30, 1965 B. M. HADFIELD ETAL 3,175,778

MEANS FOR STORING AND TRANSPORTING AN ENDLESS TAPE

Filed April 16, 1962

BERTRAM M. HADFIELD
FRANCIS H. McPARLAND
*INVENTORS*

BY Alden D Redfield
Abraham Ogman

ATTORNEYS 3,175,778

MEANS FOR STORING AND TRANSPORTING AN ENDLESS TAPE

Bertram M. Hadfield, Framingham, and Francis H. McParland, Andover, Mass., assignors to Avco Corporation, Cincinnati, Ohio, a corporation of Delaware Filed Apr. 16, 1962, Ser. No. 187,654
3 Claims. (Cl. 242—55.19)

Figure 2:
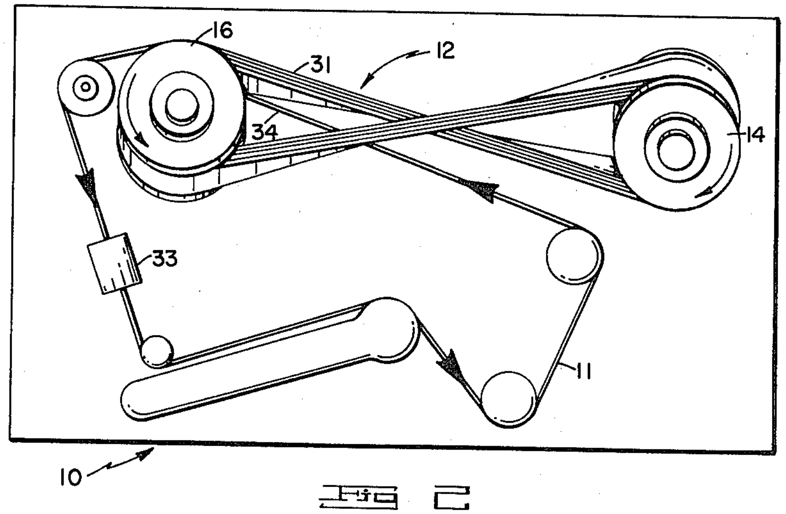

This invention relates generally to means for storing and transporting an endless tape, and in particular, to a storing and transporting means for magnetic recording tape.

An important use for tapes or ribbonlike materials is in information storage and retrieval devices such as magnetic tape recorders or punch tape devices. An endless tape storing and transporting mechanism is often used where one desires to record information for a predetermined interval of time and, additionally, delay the retrieval of the stored information. Typically, the time during which the information is recorded and stored and the delay interval are identical, both being equal to the time it takes for the tape to traverse a storage means.

Many of the methods and devices devised for the endless tape recording operate satisfactorily providing there is no limitation on size or weight. Serious problems have been encountered, however, in attempting to produce an endless tape recording device for airborne and missile use where space and weight considerations are extremely important. Heretofore, the most widely used configuration is that which is similar to the one which is disclosed in the Eggert Patent, 2,280,067, referred to hereinafter as the concentric configuration. A single reel is used and tape is drawn off from the center and returned to the outside layer via a utilization means such as recording and reproducing components.

The concentric configuration suffers from the principal limitation of a speed differential between layers as the tape moves in towards the center of the reel. The speed differential, manifestly, arises from the constantly varying diameters of the layers. Nonuniform layer speeds cause a buildup of static electricity as well as a frictional drag.

There is also a problem in that the length of the outside layer of tape is appreciably longer than the circumference of the inner diameter. Therefore, as the layer of tape on the outside of the reel travels in toward the center of the reel, the length of each layer of tape must become shorter and shorter. The excessive tape in the center of the reel must be absorbed in the tape bundle. Very often, instead of each layer being substantially circular, the tape bundle crinkles or tends to produce a small amplitude corrugation superimposed on the circular configuration. The crinkling eventually jams the tape bundle.

It will also be shown hereinafter that the concentric configuration is not an efficient utilizer of available space.

It is an object of the invention to provide a means for storing and transporting a continuous tape which avoids the limitations and disadvantages of prior art means.

It is another object of the invention to provide means for storing and transporting an endless tape which:

(1) Utilizes space efficiently,
(2) Stores tape in layers which are of equal length,
(3) Effects a reduction in drag forces,
(4) Substantially eliminates causes for crinkling,
(5) Stores tape over a path external to the storage reels in substantially the same plane with said reels without twist or bends, and
(6) Eliminates relative movement between layers of tape in the laminar belt between the storage reels.

In accordance with the invention, a storage and transporting means for an endless tape comprises at least one pair of counter-rotatable reels. Preferably the reels are skewed relative to one another. An endless tape is threaded, in layers, on each pair of reels such that the inner surface of the "$n$" layer on one reel of a pair becomes the outer surface of the $N-(n-1)$ layer of the other reel of said pair, where "$n$" is the number of a layer counting from the reel and "N" is the total number of layers on a reel. A portion of the tape is also threaded over an external utilization component such as recording and reproducing means for forming a subsidiary utilization loop.

Figure 1:
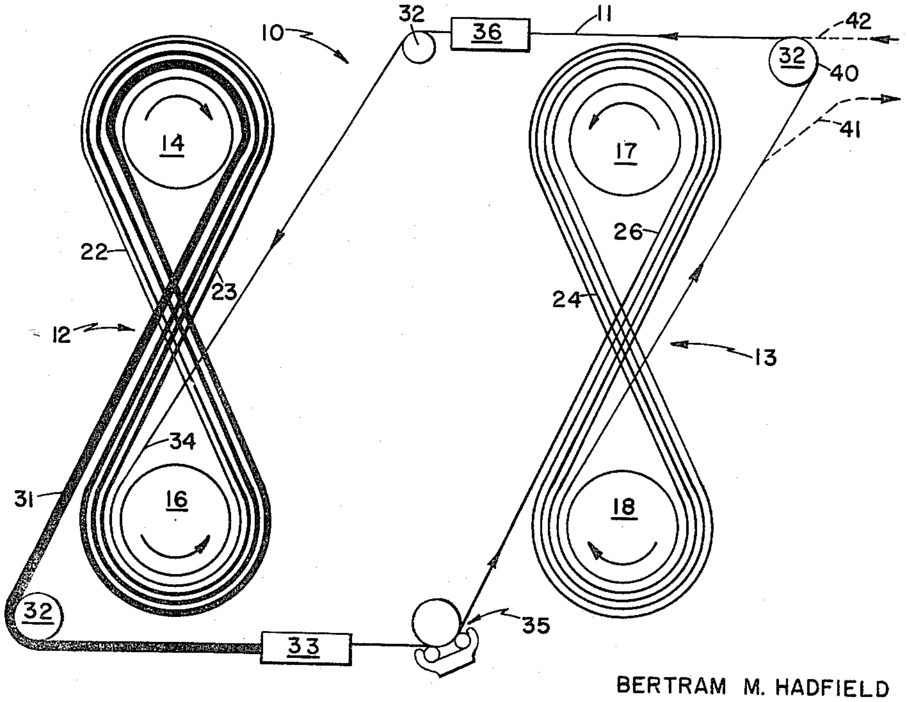

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings in which:

FIGURE 1 is a schematic representation of an endless tape transporting device embodying the principles of the present invention; and FIGURE 2 is a pictorial sketch of a two reel endless tape recording device depicting the mutually inclined or skewed arrangement of the storage reels.

The present invention is particularly useful in magnetic recording and reproducing utilization equipment. The discussion below will be directed to this type of equipment. However, it is quite obvious that the principles embodied in the present invention may be used in conjunction with punch tape equipment and to some extent wire recording equipment.

It will be further shown that the novel storage and transporting means may be used to store large quantities of tape in an open-loop configuration where tape is supplied to the storage means at one end and drawn off and utilized at the other end. The closed-loop endless tape configuration will be discussed initially and in detail.

Referring to FIGURE 1 of the drawings there is depicted therein a magnetic recording and reproducing device, generally designated 10, which uses an endless magnetic tape 11. Tape 11 is stored and transported in a manner taught by the present invention. The illustrated magnetic recording and reproducing device 10 uses two storage loops, generally designated 12 and 13. FIGURE 2 depicts a single storage loop which for simplicity will be designated 12. A pair of reels 14 and 16, shown schematically in FIGURE 1, is provided in the storage loop 12. The reels 14 and 16 are in a spaced relationship, and as seen from FIGURE 2, they are mutually inclined or skewed. The reasons for this arrangement will become apparent hereinafter. Similarly, storage loop 13 contains a pair of reels designated 17 and 18.

The reels 14, 16 and 17, 18 are counter-rotatable reels and move in direction indicated by the arrows placed on the individual reels. The direction of rotation of the reels 14, 16, 17 and 18 is compatible with the assumed direction of movement of the tape 11 as indicated by the arrows superimposed on tape 11.

Tape 11 is wound on the reels 14, 16, 17 and 18 to form a pair of "figure of 8" configurations. The laminar structure of tape 11 in each storage loop 12 and 13 is such that the inner surface of a layer of tape 11 on one reel, reel 16 for example, becomes an outer surface as it passes around the other reel, reel 14 for example, of a pair. This way there is no permanent twist in any of the tape 11 layers.

Clearly, the tape 11 has a uniform thickness. To further clarify the storage arrangement, the tape 11 and the layers of tape in storage loop 12 have been drawn with different schematic thicknesses.

It will be noted in FIGURE 1 that the "$n$' layer of tape on one reel of a pair of reels becomes the $N-(n-1)$ layer on the other reel of the pair where "n" is the number of a particular layer and "N" is the total number of layers.

It is now obvious that the pairs of reels 14, 16 and 17, 18 are skewed to avoid interference between a pair of laminar belts 22 and 23 in storage loop 12 and the laminar belts 24 and 26 in the storage loop 13 that bridge the distance between reels 14, 16 and 17, 18, respectively.

The arrangement described has some slippage between the layers where the tape passes around a reel, however, the layers of tape in the laminar belts all travel together in the same direction at the same velocity and experience no frictional drag. This is contrasted to the single continuous reel storage means where all the layers of tape are moving at a different rotational velocity; there is slippage and frictional drag throughout.

Because of the unijue "figure of 8" arrangement each layer of tape is substantially of a uniform length equal to the length of the mean layer. Layers of tape having a radius ggreater than the mean radius slip counter to the direction of rotation of a reel whereas layers of tape having a radius less than the mean radius slip in the direction of rotation. Slippage between layers increases as the distance from the mean layer increases. There is substantially no slippage in the center of a reel. In comparison with the single reel storage configuration, there is substantially less frictional loss in the "figure of 8" arrangement and higher tape speeds are possible.

Information is stored and retrieved from the tape 11 in a subsidiary utilization loop. As seen in FIGURE 1, the innermost, or first, layer of tape 11 on reel 14, layer 31 for example, is threaded over a vertical support 32 and to a recording and reproducing means 33, shown in block form. Typically, the recording and reproducing means 33 contains recording, erasing and reproducing transducers which, per se, do not form a part of the invention. In FIGURE 2 the tape 11 leaving the recording and reproducing means 33 is returned to an innermost, or first, layer 34 of reel 16.

In FIGURE 1, however, the tape 11 leaving the recording and reproducing means 33 passes through a drive mechanism 35 and is carried to the storage loop 13 where it is also stored in a "figure of 8" arrangement. Upon leaving the storage loop 13 the tape 11 passes to a second recording and reproducing means 36 and is returned as layer 34 to spool 16.

Information recorded in recording and reproducing means 33 is delayed in transit through storage loop 13 and reproduced in the second recording and reproducing means 36. Obviously, if additional delay is desired, it may be obtained by translating the information through storage loop 12, in addition to storage loop 13, and by retrieving the stored information in reproducing means 33.

In general, if "X" "figure of 8" storage loops are used, there are available "X" pair of take-off regions for subsidiary utilization loops. Accordingly, there are at least "X" possible delayed versions of a single recording within the transit time of the tape around the system.

It can be shown that the mean length of the "figure of 8" storage loop is not more than seven percent greater than the mean perimeters of the reels with tape stored thereon, for $\theta$ to 90°, where $2\pi$ minus $\theta$ is the angle subtended by the tape around the reels. Since $\theta$ equalled to 90° also means a laminar belt cross-over angle of 90°, this gives the minimum cross-over area.

With $\theta$ substantially equal to 90°, it is clear that the gross area occupied by the storage areas is about $2r \times 5r$ where small "$r$" is the outer radius of the tape on a reel. Obviously, to accommodate the same length of tape with the same thickness of tape layers on a single reel will require a radius of $2r$ and a gross area of $4r \times 4r$. Thus, the "figure of 8" arrangement has the advantage of occupying ⅝ the area of a single reel or concentric construction.

Summarizing briefly, what has been described is an integral reel system in which pairs of reels act as storage members for a continuous loop of ribbonlike material or tape, permitting the extraction of one subsidiary loop for each pair of reels, all without permanent twist or interference. The above-described system is capable of running at a speed at least as high as conventional storage systems using noncontinuous tapes fed from one spool to another. The running speed may be higher because there is no problem of an inherent variation in reel speed and ribbon tensions as is found in conventional discontinuous tape systems.

Returning to FIGURE 1 momentarily, an open-loop storage and transporting means may easily be constructed by breaking the tape at some convenient point such as point 40. Tape may be removed from the storage device at 41, for example, and fed to the storage device at 42 as indicated by the dotted lines symbolizing discontinuous tape 11. A convenient "first-in," "first-out" storage system is achieved having all of the benefits cited above.

The various features and advantages of the invention are though to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. A means for storing and transporting an endless tape stored in self-imposed layers comprising:
(*a*) at least one pair of counter-rotable reels on axes skewed with respect to each other;
(*b*) an endless tape on each pair of reels arranged in a figure 8 configuration, said layers being of substantially equal length; and
(*c*) means for driving said tape.

2. A means for storing and transporting an endless tape as described in claim 1 which includes in addition a tape utilization means.

3. A means for storing and transporting an endless tape as described in claim 1 in which said pairs of reels are interconnected by said tape being threaded from one pair of reels to and from another pair of substantially identically constructed reels.

References Cited by the Examiner

UNITED STATES PATENTS

| | | | |
|---|---|---|---|
| 1,459,795 | 6/23 | Pavely et al. | 242—55.01 |
| 1,672,144 | 6/28 | Zanchi | 242—53 |
| 2,074,022 | 3/37 | Oppenlaender | 242—47.09 |

FOREIGN PATENTS

| | | | |
|---|---|---|---|
| 647,387 | 7/37 | Germany. | |

MERVIN STEIN, *Primary Examiner.*

JOSEPH P. STRIZAK, *Examiner.*